April 1, 1952     R. M. KOCH     2,591,362
FLOWERPOT STAND
Filed Oct. 9, 1946     3 Sheets-Sheet 1
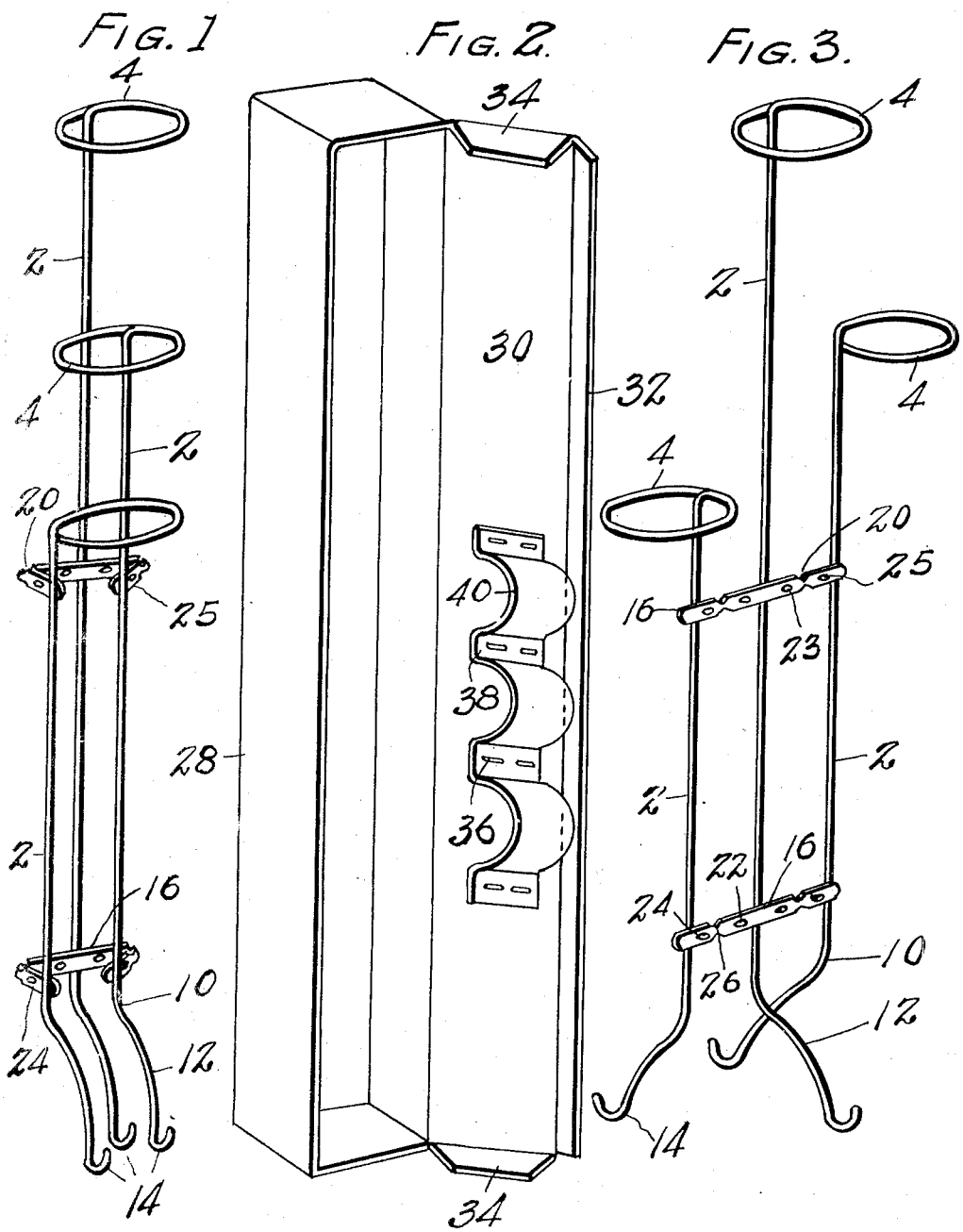
INVENTOR.
RODERIC M. KOCH
BY
Charles K. Davies & Son
Attys April 1, 1952 R. M. KOCH 2,591,362
FLOWERPOT STAND
Filed Oct. 9, 1946 3 Sheets-Sheet 2

INVENTOR.
RODERIC M. KOCH
BY
Charles K. Davies Son
Attys.

April 1, 1952 — R. M. KOCH — 2,591,362
FLOWERPOT STAND
Filed Oct. 9, 1946 — 3 Sheets-Sheet 3

INVENTOR.
RODERIC M. KOCH
BY
Charles K. Davies & Son
Attys.

Patented Apr. 1, 1952

2,591,362

UNITED STATES PATENT OFFICE 2,591,362

FLOWERPOT STAND

Roderic M. Koch, Evansville, Ind.

Application October 9, 1946, Serial No. 702,152

3 Claims. (Cl. 211—74)

My present invention relates to an improved flower pot stand and more particularly to the structure of the stand whereby the stand may be assembled for shipping in a carton designed therefor and occupying a minimum of space and the frangible attaching or connecting means for the elements of the stand may be broken and the separated portions thereof secured together in position to effect an ornamental stand pleasing in appearance and having utility.

It is common knowledge that conventional flower pot stands of wire material necessarily require considerable shipping space to accommodate an assembled stand, and it is therefore the principal purpose of this invention to provide a flower stand which may be closely assembled for shipping at the factory and then re-assembled with facility by the purchaser.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a perspective view of the stand assembled for shipping.

Fig. 2 is a perspective view of the shipping carton.

Fig. 3 is a perspective view of the stand, having the frangible connecting links bent and ready for separation.

Figure 4:
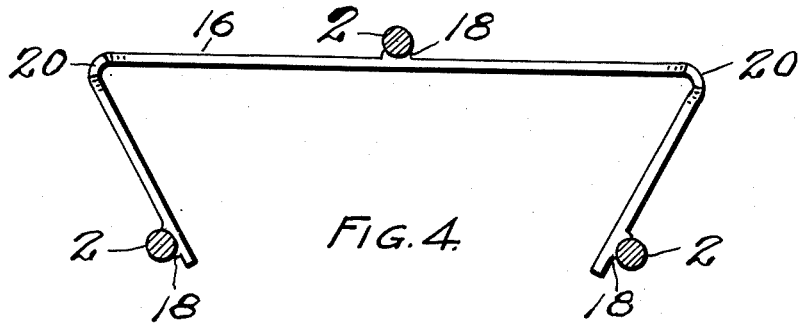
Fig. 4 is a horizontal sectional view through the three vertical rods showing the connection in plan as pre-assembled.
Figure 5:
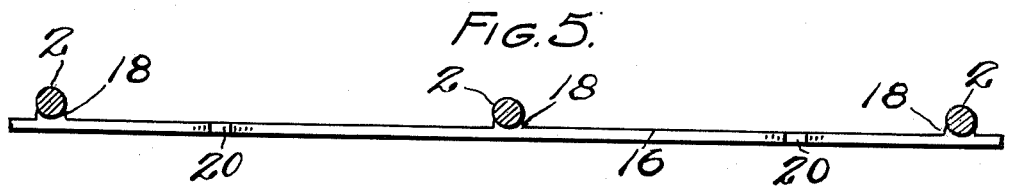
Fig. 5 is a similar view showing the connection ready for separation.
Figure 6:
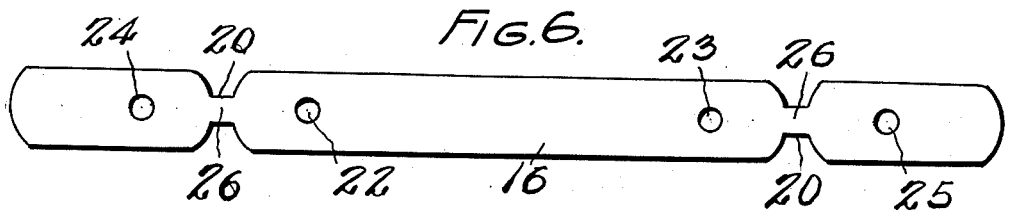
Fig. 6 is a front elevational view thereof.
Figure 7:
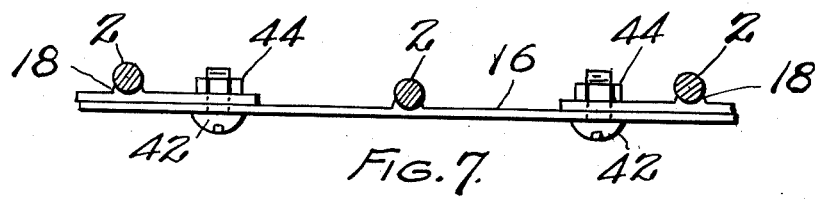
Fig. 7 is a horizontal sectional view of the connection after separation and assembly at line 7—7 of Fig. 9.

Referring now to the drawings wherein I have illustrated the present preferred embodiment of my invention comprising the rods 2 of varying lengths and having upper loops 4 for the conventional flower pot 6 formed with an annular ring 8.

The lower portions of the rods are bent outwardly at 10 and arch downwardly at 12 to the hooks 14 forming feet.

In assembly at the factory, the rods are connected by links 16 of metal welded to the rods at 18 and having aligned edge notches 20. The middle section of the link is formed with apertures 22—23 and the outer end portions are perforated at 24—25 respectively. In the assembly at the factory the links are bent at the tongues 26 connecting the sections so that the rods lie in close proximity for shipping in the container 28.

This carton or container is usually of pasteboard or cardboard and has a cover 30 having flanges 32 and 34. The cover interiorly has secured as by staples 36 a strip 38 formed with loops 40 to receive therein conventional flower pots 6.

With the pre-assembled stand in the carton and the pots in place in the loops 40, necessary accessories such as bolts and nuts may be placed in the carton for shipping as a complete unit. The pre-assembly of the stand permits the use of a small container and cuts down shipping costs and labor costs.

When in the hands of the person desiring to use the stand, it is removed from the carton and the outer rods are grasped and swung out and back using the tongues 26 as pivot points and in this movement the tongues will be broken due to the notching of the links and the rods and their respective link sections will be separated.

Figure 9:
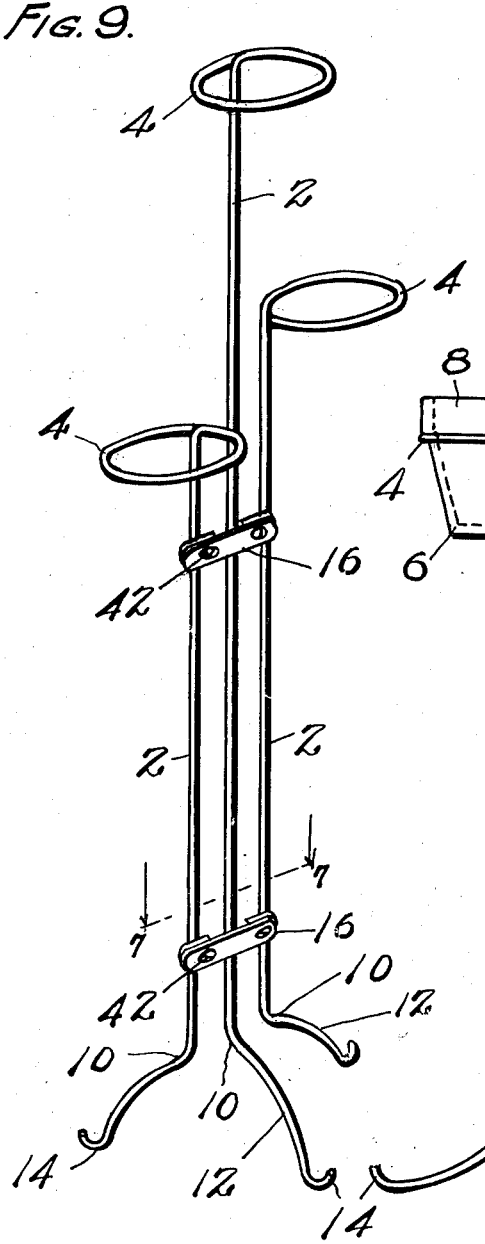
Fig. 9 is a perspective view of the assembled stand.

Then using bolts 42 and nuts 44 the bolts passing through aperture 22 and hole 24, and aperture 23 and hole 25, respectively, the section of the links again secure the rods in the position of Fig. 9.

The feet 14 are now radially positioned to provide a secure support for the assembled stand and the pots 6 are placed in the loops 4.

Figure 8:
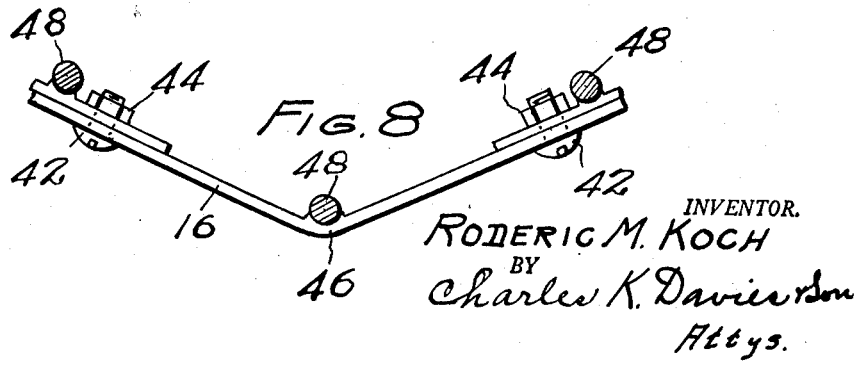
Fig. 8 is a horizontal sectional view at line 8—8 of Fig. 10.
Figure 10:
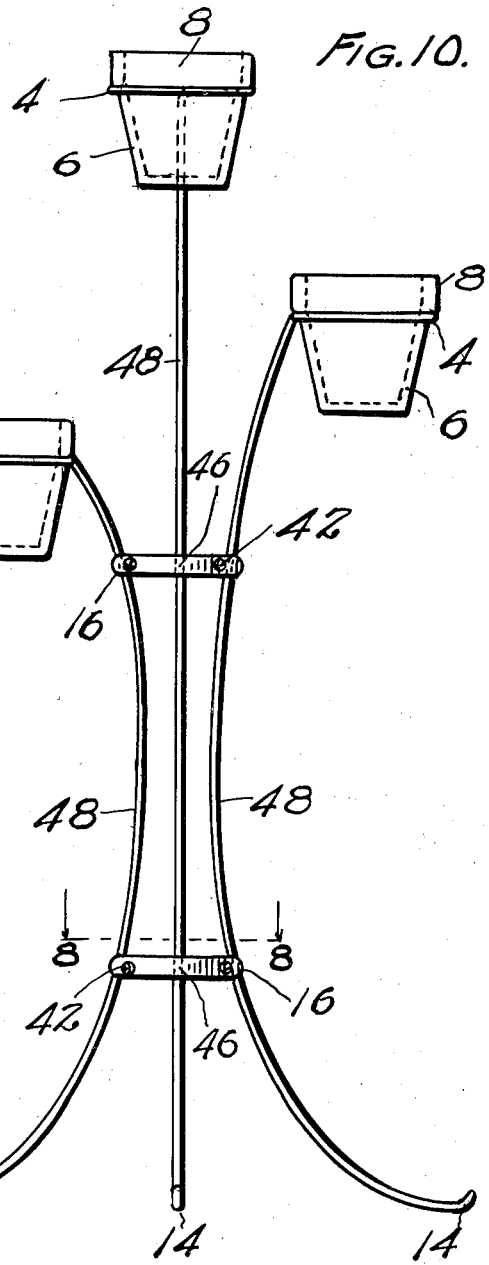
Fig. 10 is a front elevational view of the assembled stand ready for use, the links modified as illustrated.

In Figs. 8 and 10 the links 16 may be fashioned with a vertical bend 46 and the rods 48 of varying lengths consist of a single curved rod connecting the upper loops 4 and the hook feet 14.

From the above description it will be apparent that the stand of my invention may be pre-assembled at the factory in a compact unit for shipping in the container necessarily elongated but of relatively narrow cross section, and upon reaching the consumer, the stand may be separated with ease and then assembled for use with facility.

Having thus fully described my invention what

I claim as new and desire to secure by Letters Patent is:

1. In a flower-pot stand adapted for shipping purposes including three spaced metallic rods of varying lengths, each of said rods having an upper horizontally disposed pot-holding means thereon, and means at their lower ends for supporting said rods in vertical position, the combination of a pair of vertically spaced horizontally disposed links each having a welded joint to the central rod, and coacting means uniting the opposed ends of the links with each of the other two rods.

2. In a flower-pot stand including three spaced metallic rods, each having an upper looped-end forming a flower-pot holder and means at their lower ends for supporting the rods in vertical position, the combination of a pair of vertically spaced and horizontally disposed main links each having a welded joint to the central rod, each said link having two horizontally spaced pairs of vertically alined notches and terminating in opposed end-tongues, and said tongues in vertically arranged pairs each having a weld-joint to each of the other two rods.

3. In a flower-pot stand including a central and two laterally arranged and upright rods each having an upper horiontally disposed pot-holding means thereon, and means at their lower ends for supporting said rods in vertical position, the combination of a pair of vertically spaced main horiontal links each having a welded joint on the central rod, an end-link bolted to each of the respective ends of the main links, and each end-link having a welded joint to a lateral rod.

RODERIC M. KOCH.

REFERENCES CITED

The following references are of record in the file of this patent:

UNITED STATES PATENTS

| Number | Name | Date |
|---|---|---|
| 170,399 | Reynolds | Nov. 23, 1875 |
| 245,563 | Rouse | Aug. 9, 1881 |
| 750,063 | Redding | Jan. 19, 1904 |
| 1,043,622 | Miles | Nov. 5, 1912 |
| 1,094,009 | Parkhurst | Apr. 21, 1914 |
| 1,350,237 | Porter | Aug. 17, 1920 |
| 1,495,186 | La Rue | May 27, 1924 |
| 1,897,905 | Johnson | Feb. 14, 1933 |
| 2,092,691 | Berghoff | Sept. 7, 1937 |
| 2,126,114 | Jett | Aug. 9, 1938 |
| 2,406,587 | Cooper | Aug. 27, 1946 |